No. 743,102. PATENTED NOV. 3, 1903.
G. H. RABENALT.
BATTERY GRID.
APPLICATION FILED NOV. 5, 1902.
NO MODEL.
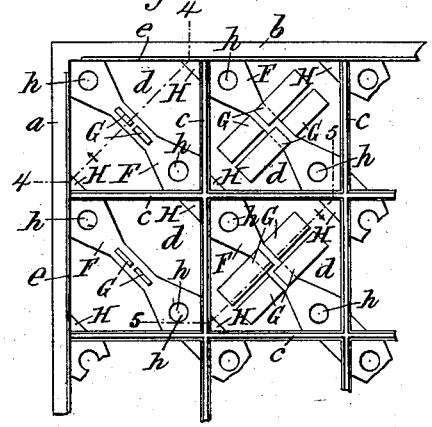
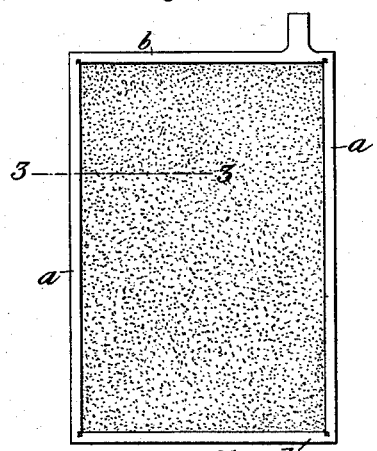
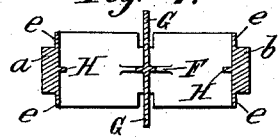
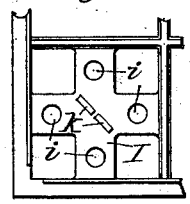
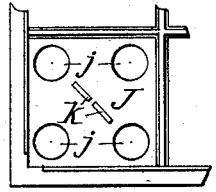
Witnesses:
Gustav H. Rabenalt, Inventor,
By Wilhelm _____ Attorneys.

No. 743,102. Patented November 3, 1903.

UNITED STATES PATENT OFFICE.

GUSTAV H. RABENALT, OF BUFFALO, NEW YORK, ASSIGNOR TO GOULD STORAGE BATTERY COMPANY, OF NEW YORK, N. Y., A CORPORATION OF WEST VIRGINIA.

BATTERY-GRID.

SPECIFICATION forming part of Letters Patent No. 743,102, dated November 3, 1903.

Application filed November 5, 1902. Serial No. 130,150. (No model.)

*To all whom it may concern:*

Be it known that I, GUSTAV H. RABENALT, a subject of the Czar of Russia, residing at Buffalo, in the county of Erie and State of New York, have invented new and useful Improvements in Battery-Grids, of which the following is a specification.

This invention relates to secondary-battery or accumulator electrodes, and is directed more particularly to the construction of the grid or holder for the active material.

It is a recognized fact that the mass of the active material or spongy lead of negative electrodes shrinks or contracts and draws away from the surrounding parts of the grid to such an extent, depending on the construction of the grid, as to seriously decrease or sometimes entirely destroy its contact with the grid. This defective contact between the active material and the grid due to shrinkage of the latter has ordinarily been neglected or inadequately remedied.

One object of the present invention is to provide a grid of such a construction that the active material is securely held on the grid, and an intimate reliable contact is maintained at all times between the grid and the active material regardless of the shrinking of the latter. To this end the grid is formed with anchoring-pieces embedded in and surrounded by the active material, which in shrinking contracts and closes tightly around the anchoring-pieces and always has an extended intimate contact therewith.

A further object of the invention is to so form the electrode that a large surface of the active material is exposed, thereby decreasing the wear or consumption of the same and equally exposing all parts of the active material to the action of the acid, thus equalizing the wear throughout the electrode and preventing some parts thereof from being called into action more than other parts, which is a fault so common in secondary electrodes.

Another object is to provide means for holding intact the marginal or edge portions of the mass of active material, which loses its adhesion for the surrounding portions of the grid, and prevent the breaking and dislodgment of the same from the grid in the careless or rough handling of the electrode.

In the accompanying drawings, Figure 1 is an elevation of a portion of an electrode-grid embodying the invention. Fig. 2 is an elevation, on a reduced scale, of the electrode after the active material has been applied to the grid. Fig. 3 is a fragmentary section, on an enlarged scale, of the electrode in line 3 3, Fig. 2. Fig. 4 is a section through one of the grid-compartments in line 4 4, Fig. 1. Fig. 5 is a section of the grid in line 5 5, Fig. 1. Figs. 6 and 7 are fragmentary elevations illustrating slightly-different forms of anchoring-pieces.

Like letters of reference refer to like parts in the several figures.

The grid or holder is in the form of an open frame provided with side and end outside bars $a$ and $b$ and intermediate bars or strips $c$, which cross or intersect each other, dividing the grid into a plurality of compartments or spaces $d$ for the active material. The cross-bars are sufficiently-numerous to give the requisite stiffness and strength to the grid. In the construction shown in the drawings they are arranged parallel with the side and end bars of the grid; but this arrangement is not essential. The cross-bars are of less width than the thickness of the outside grid-bars, as shown in Fig. 3, so that when the spongy lead is applied to the grid the cross-bars are embedded therein and covered thereby. The side and end bars are provided at their inner edges with longitudinal flanges $e$, which when the grid is formed project laterally from the opposite sides of the grid, as shown in Figs. 1 and 4. Either before or after the spongy lead is applied to the grid these flanges are bent or pressed down by suitable means, so as to project inwardly from opposite sides of the outside bars and overlap and protect the marginal portions of the mass of spongy lead.

Each of the compartments $d$ for the active material is provided with an anchoring device, which in the form shown in Figs. 1 to 5 of the drawings consists of a bridge-piece F, which extends diagonally across the compartment or space $d$ and is provided on each side with a pair of plates or strips G. Preferably the bridge-pieces and plates are broad and thin. When the grid is formed, the plates G extend laterally outward from the bridges to opposite sides of the grid, as shown at the left hand in Fig. 1 and in Fig. 4. Before or after the active material is applied to the grid the plates or strips G are bent down by suitable means into the position indicated at the right in Fig. 1 and in Fig. 5, so that they extend from the bridge-pieces diagonally toward the corners of the compartments d. The corners of the compartments opposite the ends of the plates G are provided with thin corner-plates H. The bridge-pieces are preferably perforated at h to lighten the grid and give the anchoring-pieces a still better hold on the spongy lead.

As the spongy lead shrinks and draws away from the outside bars or the cross-bars inclosing the masses of spongy lead in the several compartments it contracts or closes tightly about the bridge-pieces and plates of the anchoring devices and is always maintained in intimate effectual contact therewith. The flanges of the outside bars are of sufficient width to cover or confine and protect the marginal portions of the mass and prevent the breaking and dislodgment of the same from the grid. The corner-plates H remain embedded in the spongy lead as it shrinks away from the corners of the compartments and braces the mass at these points, materially aiding to prevent the breaking of the spongy lead. As shown in Fig. 2, the spongy lead surrounds and covers the several cross-bars and anchoring devices. This described formation of the grid therefore exposes the greatest possible surface of the spongy lead to the action of the acid.

The grid is constructed of any suitable material, such as lead or a mixture of lead and antimony, and it can be made in any suitable way, either by casting, pressing, or otherwise.

The anchoring devices may be of different formation from those shown in Figs. 1 to 5. For instance, as shown in Fig. 6, they are in the form of thin cross-shaped plates I, the arms of which extend parallel with the cross-bars of the grid, and are preferably provided with holes i, or, as shown in Fig. 7, the anchoring devices consist of thin plates J of the same shape as the compartments d and provided with large holes j to give the spongy lead the necessary hold on the plates and decrease the weight of the grid.

The anchoring devices shown in both Figs. 6 and 7 are provided with lateral plates k, arranged and acting similarly to the plates G of the anchoring devices shown in Figs. 1 to 5.

I claim as my invention—

1. An electrode-grid comprising outside bars, intermediate bars dividing the grid into a plurality of compartments, and relatively thin anchoring devices which bridge said compartments and are provided with projecting parts adapted to be embedded in the active material, substantially as set forth.

2. An electrode-grid comprising outside bars, intermediate bars dividing the grid into a plurality of compartments, and anchoring devices consisting of thin plates which bridge said compartments, and parts which are disposed on opposite sides of said bridge-plates, substantially as set forth.

3. An electrode-grid comprising outside bars, intermediate bars dividing the grid into a plurality of compartments, and anchoring devices consisting of thin plates which extend diagonally across said compartments and have parts which are disposed at opposite sides of said bridge-plates and extend toward the other corners of the compartments, and thin plates arranged in said other corners of the compartments, substantially as set forth.

4. An electrode comprising a grid provided with outside bars having inwardly-projecting flanges, intermediate bars dividing the grid into a plurality of compartments, relatively thin anchoring devices arranged in said compartments and provided with parts for taking hold of the active material, and a mass of active material which surrounds and covers said intermediate bars and anchoring devices and the marginal portions of which are protected by said flanges of the outside grid-bars, substantially as set forth.

Witness my hand this 1st day of November, 1902.

GUSTAV H. RABENALT.

Witnesses:
C. S. CHAMBERLAIN,
E. B. ROWLEY.